T. N. DAVEY.
STEAM TRAP.

No. 60,622. Patented Dec. 18, 1866.

Witnesses:
F. A. Jackson
Alex F. Roberts

Inventor:
Thos. N. Davey
Per Murry & Co
Attorneys

United States Patent Office.

IMPROVEMENT IN STEAM TRAPS.

THOMAS N. DAVEY, OF JEFFERSONVILLE, INDIANA.

Letters Patent No. 60,622, dated December 18, 1866.

*The Schedule referred to in these Letters Patent and making part of the same.*

TO ALL WHOM IT MAY CONCERN:

Be it known that I, THOMAS N. DAVEY, of Jeffersonville, in the county of Clark, and State of Indiana, have invented a new and improved Steam Trap; and I do hereby declare that the following is a full, clear, and exact description thereof.

The object of this invention is to automatically relieve steam cylinders, steam pipes, and all other apparatus where steam is used, from condensed steam or water of condensation; also, to give the engineer or operator a full and easy control of the trap-valve under all circumstances, whether under the pressure of steam or not, thereby giving all the advantages of the ordinary cock or faucet and steam trap combined.

To enable others skilled in the art to make and use my invention, I will proceed to describe its construction and operation, reference being had to the accompanying drawings, forming a part of this specification, and to the letters of reference marked thereon, in which—

Figure 1:
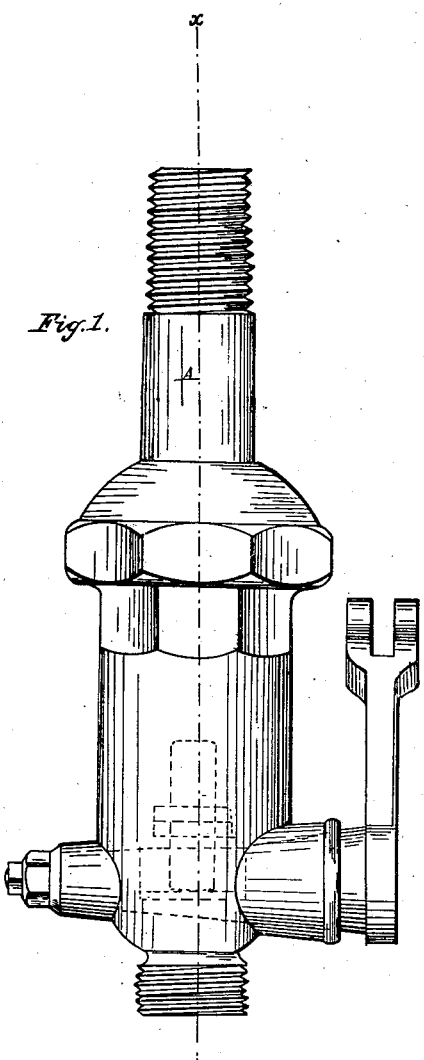
Figure 2:
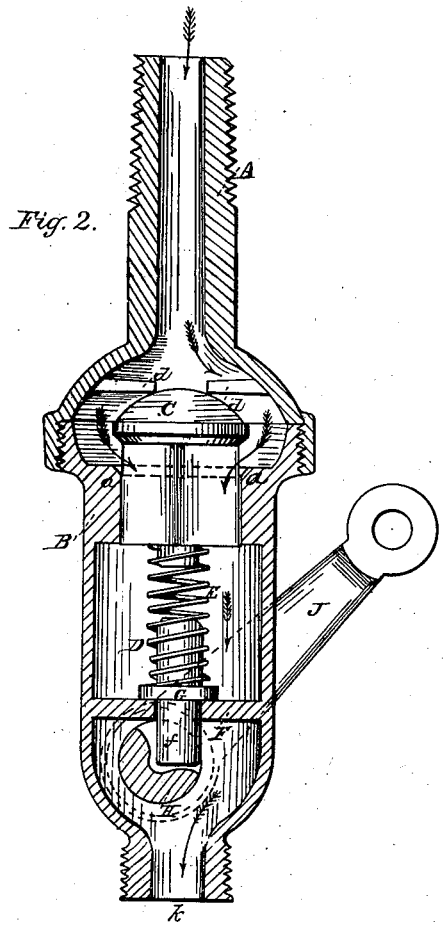

Figure 1 represents a side elevation of the trap complete; and
Figure 2 is a vertical section of the trap through the line $x$ $x$ of fig. 1.

The same letters of reference indicate like parts.

A is the stem or upper portion of the trap, which is attached to the steam cylinder or steam pipe, and which first receives the steam. It is enlarged at its lower part, and its interior lower portion forms a chamber. B is the case or lower portion of the trap; it is screwed into A at its upper end, as seen in the drawing. In this case, B, of the trap is the valve-seat, $a$, upon which the valve, C, works. This valve, C, is kept steady and in place by wings upon it below the seat, which are guided by that portion of B, the water escaping between the wings into the chamber, D, below. This valve is prevented from rising too high by stops, $d$, which are mere projections from the inside surface of the chamber in A over the valve. There is a short stem on the valve, C, extending below the wings, and which serves as a guide for the spiral spring, E, by which the valve is raised when it is in operation. The case, B, is enlarged below the wings of the valve, C, forming the chamber, D. The spiral spring, E, works in this chamber. Transversely across this chamber, D, there is a cross-bar, F, which forms a seat and guide for the adjustable spring-seat, G, which is a round disk, from which a stem extends both above and below, or from its upper and lower sides; the lower one is shown at $f$; this stem extends through the cross-bar, F, and its lower end rests on the cam or key, H. Through the lower portion of the case, B, (horizontally,) there is formed a faucet-barrel, to which is fitted a plug, which fits tightly in the barrel, and is secured to its place by a washer and nut in the usual manner. The middle portion of this plug is cut away and forms a cam or eccentric, H, upon which the lower stem of the spring-seat rests, as represented in the drawing. On the other end of this faucet-plug there is an arm, J, by which it is operated or oscillated back and forth. The cam, H, acting through the arm or handle, J, adjusts the spring-seat, G, first to a height sufficient to tighten the spring to suit different pressures of steam on the valve, C, and then to throw the upper stem of the spring-seat, G, up against the stem of the valve, C, raising it so as to allow a clear exit throughout the trap, the exit being at $k$.

The operation of the trap will be readily understood. The upper end of A being screwed into the cylinder or steam pipe, the steam enters and presses down the valve, C, and holds it to its seat until the cylinder is exhausted of steam. The valve is then of course relieved of pressure, and is immediately thrown up by the spring, E, and the water of condensation or condensed steam escapes down into and through the chamber, D, having its exit at $k$. By moving the arm or handle, J, the cam or eccentric, H, is thrown up against the lower stem of the spring-seat, G, first tightening the spring to suit different pressures of steam, or, in case of necessity, raising the valve, C, thus allowing free exit of water, or other matter, at the option of the attendant.

Having thus described my invention, what I claim as new, and desire to secure by Letters Patent, is—

1. The stem or upper portion A, and the case B, when combined with the faucet-barrel, cam or key H, and the arm or handle J, constructed substantially as described.

2. I claim the cam H when used in connection with the adjustable spring-seat G and spring E, substantially as herein shown and described.

THOMAS N. DAVEY.

Witnesses:
JOSEPH B. MUIR,
THOMAS DAVEY.